Figure 1:
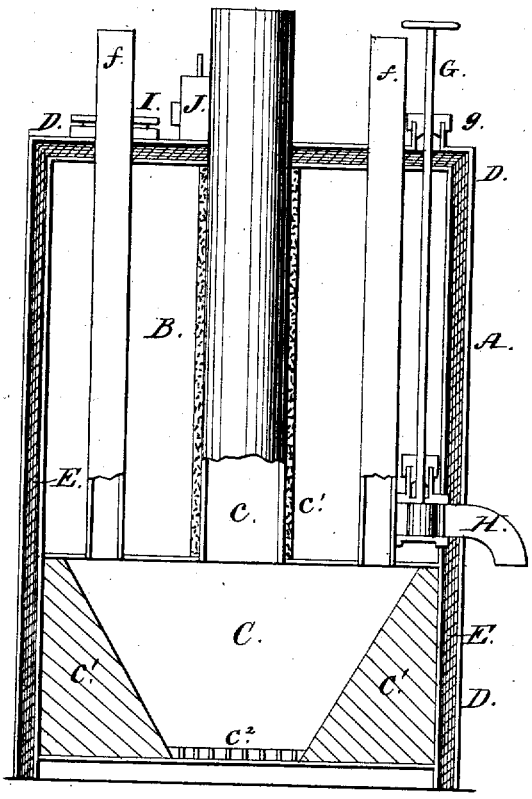

T. NEW.

Tank for Asphaltic-Cement.

No. 6,684. Reissued Oct. 5, 1875.

Witnesses:
H. W. Throckmorton
A. B. Atkinson

Inventor:
Tobias New
Munn & Co

N. PETERS, PHOTO-LITHOGRAPHER, WASHINGTON, D. C.

UNITED STATES PATENT OFFICE.

TOBIAS NEW, OF NEW YORK, N. Y.

IMPROVEMENT IN TANKS FOR ASPHALTIC CEMENT.

Specification forming part of Letters Patent No. 147,423, dated February 10, 1874; reissue No. 6,684, dated October 5, 1875; application filed August 14, 1875.

DIVISION B.

*To all whom it may concern:*

Be it known that I, TOBIAS NEW, of the city, county, and State of New York, have invented a new and Improved Method of Making Asphalt Pavements, Roofs, &c., of which the following is a specification:

In the common way of making roadways, pavements, roofs, &c., of asphalt there is a deterioration of the quality of the asphalt, due to the over distillation in open or not air-tight kettles by the high heat necessary to liquefy it for application, which is fatal to its adhesive properties, and is the main cause of the cracking and breaking of such pavements when contracted by cold. There is also a considerable percentage of loss of material in the common way of breaking up the solid packages in the street to put the material in the melting-kettles for reducing it to a liquid state necessary for its application, and while so melting there is a loss of the time of the operators, when jobbing about, in the application and repairs of roofs, and the smell and smoke are very objectionable in the street. All of these objectionable results are due to the cooling off and solidifying of the asphalt after its preparation from coal-tar by distillation, and in addition thereto there is a loss of money in the waste of heat by cooling, also in the necessary destruction of the packages for removing the asphalt, and also in the imperfect method of heating it in kettles.

My improvement has for its object to obviate all these difficulties and economize the cost, but especially to preserve the adhesive qualities in the highest degree, and thus make better pavements, &c.

To this end my improvement in the method of making roofs, &c., consists in maintaining the asphalt in the liquid state from the time it is distilled till it is applied, in addition to the ordinary operations, using air-tight vessels or tanks if to be kept long. The vessels or tanks will be of different kinds and sizes, according to the different purposes and uses, and they will be heated or maintained in a heated state in different ways. Some, for instance, may be large stationary vessels or tanks to serve for depots for storing until wanted for use, with permanent heating apparatus. Others may be portable holders or packages of smaller size for conveying the substance from the depots to the localities where it is to be applied, and have temporary heating devices; or any ordinary package or holder may be used in a truck having a kind of hot oven for conveying the packages from the still or depot to the place for use. The packages will of course be protected with non-heat-conducting material to render the waste as little as possible.

Figure 2:
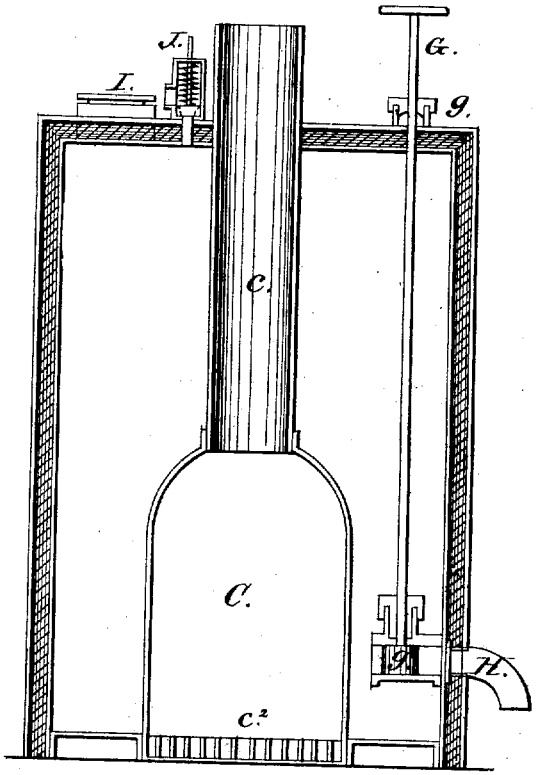
Figure 3:
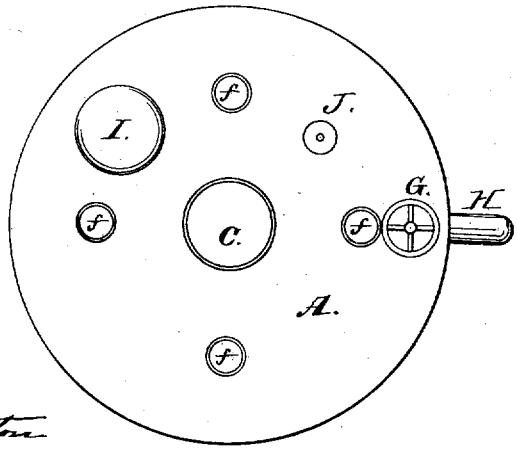

Figures 1 and 2 of drawing are sectional side elevations, showing a liquid-cement barrel or portable package embodying the principle of my invention. Fig. 3 is a plan or top view.

Similar letters of reference indicate corresponding parts.

A represents the barrel or package, in which is an asphalt-chamber, B, and a subjacent furnace, C, the latter having the smoke-pipe *c*, extending up through the middle, surrounded by fire-brick $c^1$, and provided with the grate $c^2$. D is a metallic shell, within which, and adjacent thereto, is a felt lining, E, or equivalent non-conductor of heat. The non-conductor may be placed on the outside, but I prefer to place it within the chamber. The fire-chamber is not only provided with central flue *c*, but, preferably, also with vertical flues *f*, that assist in an equal distribution of heat through the mass of cement, and (the fire being extinguished) in the speedy reduction of the temperature before use to about 400° Fahrenheit. G is a hand-rod passing through the packing *g*, and having on lower end the valve *g'*, that fits into the discharge-faucet H. I is an inlet, and J is a safety valve.

Fig. 2 of the drawing represents a modification which exhibits the general principle of my invention, but which is not by me considered so desirable as that shown in Fig. 1. In this the liquid cement is brought around an oval fire-pot, and the air-tubes extending through cement-chamber are omitted. The metallic barrel is made air-tight to prevent the evaporation of the valuable adhesive properties of the cement, and, in conjunction with the inner lining, which is a non conductor of heat, to prevent the escape of caloric. The asphaltic cement is drawn from the still into these barrels or packages, which are then transferred to a chamber kept always at a suitable temperature, and there held in readiness to be supplied to the trade. During transportation from one locality to another, in the same or different cities, a small fire is maintained in the furnace only sufficient to make up for the heat that will very slowly escape from the air-tight and heat-protected package. Practically the average of fuel used in the chamber where the barrels are kept in bulk and in the barrel-furnace during transportation to the building or place of use, will probably not be equal to that now employed to melt the solid asphalt in the open kettles. My object is to preserve the cement at a temperature of about 365° without the evaporation of its adhesive properties, and have it drawn from the barrel or package by the roofer or paver as he is ready to employ it. When applied under these conditions it makes the most valuable cement now known to the trade for roofing or paving. By retaining and preserving the heat contained in the asphalt when it comes from the still a great saving of expense is effected, not only by avoiding the cost of reheating, but by having it in a liquid state at the moment of the arrival on the premises where it is to be applied. The men may get to work at once, and thus save much valuable time, now wasted, during the melting of the solidified article; but more important than all else is the preservation of the adhesive properties, so that the product is a very superior roof or roadway, not liable to crack in cold weather.

By the crude and uncertain method of heating in open kettles there is no means of determining, regulating, and controlling with any certainty the heat applied, and at best some parts lying in close contact with the bottom of the kettle will be greatly injured by overheating, but in my method permanent contrivance may be employed for regulating the heat to exactly the degree wanted, and constantly maintaining it thereat.

Having thus described my improvement in the manufacture of roadway, sidewalks, roofs, &c., of asphaltic cement, I claim—

The process of applying asphaltic cement to pavements, roofs, and analogous uses in a liquid state before the heat of distillation has passed away, substantially as and for the purpose specified.

TOBIAS NEW.

Witnesses:
L. W. HARRINGTON,
NATHAN DUFF.